United States Patent
Heindl et al.

(10) Patent No.: US 6,680,271 B1
(45) Date of Patent: Jan. 20, 2004

(54) SOLID ZEOLITE GRANULATES HAVING IMPROVED ABRASION RESISTANCE, AND METHODS OF MAKING THEM

(75) Inventors: Frank Heindl, Rodenbach (DE); Eckehart Roland, Hartsdale, NY (US); Elke Kossel, Limeshain (DE); Oliver Feuer, Maintal (DE)

(73) Assignee: Grace GmbH & Co. KG, Worms (DE)

( * ) Notice: Subject to any disclaimer, the term of this patent is extended or adjusted under 35 U.S.C. 154(b) by 0 days.

(21) Appl. No.: 09/595,908

(22) Filed: Jun. 20, 2000

Related U.S. Application Data

(63) Continuation-in-part of application No. 08/991,990, filed on Dec. 17, 1997, now abandoned.

(51) Int. Cl.[7] .................................. B01J 29/06; B01J 29/04
(52) U.S. Cl. .............................. 502/64; 502/63; 502/85; 502/86
(58) Field of Search ........................... 502/63, 64, 85, 502/86; 427/452

(56) References Cited

U.S. PATENT DOCUMENTS

| | | | |
|---|---|---|---|
| 3,234,147 A | * | 2/1966 | Drost et al. ................... 252/455 |
| 3,296,151 A | * | 1/1967 | Heinze et al. ................. 252/448 |
| 3,356,450 A | * | 12/1967 | Heinze et al. ................... 23/112 |
| 3,382,187 A | * | 5/1968 | Drost et al. ................... 252/455 |
| 3,844,977 A | | 10/1974 | Young ........................... 252/438 |
| 3,886,094 A | * | 5/1975 | Pilato et al. .................. 252/451 |
| 3,894,964 A | | 7/1975 | Roebke et al. |
| 4,192,773 A | | 3/1980 | Yoshikawa et al. ...... 252/429 R |
| 4,217,240 A | | 8/1980 | Bergna ......................... 252/313 S |
| 4,476,169 A | | 10/1984 | Nishino et al. ................. 428/34 |
| 4,528,276 A | | 7/1985 | Cambell et al. ................. 502/62 |
| 4,542,115 A | | 9/1985 | Strack et al. |
| 4,594,332 A | | 6/1986 | Hoelderich et al. ............ 502/64 |
| 4,620,399 A | * | 11/1986 | Strack et al. .................... 52/172 |
| 4,666,875 A | | 5/1987 | Pellet et al. ..................... 502/65 |
| 4,800,187 A | | 1/1989 | Lachman et al. .............. 502/64 |
| 4,946,814 A | | 8/1990 | Shi et al. ......................... 502/62 |
| 5,098,448 A | | 3/1992 | Puppe et al. |
| 5,135,756 A | | 8/1992 | Shi et al. ......................... 502/62 |
| 5,168,084 A | | 12/1992 | Pellet et al. ...................... 502/9 |
| 5,278,113 A | | 1/1994 | Ono et al. ....................... 502/66 |
| 5,330,943 A | | 7/1994 | Shi et al. ......................... 502/62 |
| 5,387,564 A | | 2/1995 | Takeuchi et al. ............... 502/62 |
| 5,716,899 A | | 2/1998 | Guile et al. ................... 502/439 |

FOREIGN PATENT DOCUMENTS

| | | |
|---|---|---|
| DE | 3132379 | 2/1983 |
| DE | 3401485 | 12/1985 |
| DE | 2233070 | 1/1994 |

OTHER PUBLICATIONS

*Patent Abstracts of Japan*, vol. 011, No. 132 (C–417), Apr. 24, 1987 & JP 61 266306 dated Nov. 26, 1986.

* cited by examiner

Primary Examiner—Cam N. Nguyen
(74) Attorney, Agent, or Firm—William D. Bunch; Charles A. Cross

(57) ABSTRACT

Zeolite granulates having improved abrasion resistance, obtained by spraying the zeolite granulates with an aqueous silica sol solution and then optionally drying and calcining them.

19 Claims, 1 Drawing Sheet

SOLID ZEOLITE GRANULATES HAVING IMPROVED ABRASION RESISTANCE, AND METHODS OF MAKING THEM

The present application is a continuation-in-part of U.S. patent application Ser. No. 08/991,990, filed Dec. 17, 1997, which is incorporated herein by reference in its entirety.

INTRODUCTION AND BACKGROUND

The present invention relates to a process of making and treating solid zeolite granulates in order to enhance their abrasion resistance. In another aspect, the present invention relates to the improved solid zeolite granulates obtained thereby.

Zeolites are well known and find use in the fields of application of adsorption and catalysis mainly as molded bodies, extrudates or granulates, whose mean diameter can range from approximately 30 μm to approximately 10 mm.

Zeolites were first recognized as a new type of mineral in 1756. The word zeolite was derived from two Greek words meaning to boil and a stone. Several properties of zeolite minerals have been studied, including adsorption and ion exchange. These studies led to the preparation of amorphous aluminosilicate ion exchangers for use in water softening. Studies of the gas-adsorption properties of dehydrated natural-zeolite crystals more than 60 years ago led to the discovery of their molecular-sieve behavior. As microporous solids with uniform pore sizes that range from 0.3 to 0.8 nm, these materials can selectively adsorb or reject molecules based on their molecular size. This effect, with obvious commercial overtones leading to novel processes for separation of materials, inspired attempts to duplicate the natural materials by synthesis. Many new crystalline zeolites have been synthesized and several fulfill important functions in the chemical and petroleum industries and consumer products such as detergents.

More than 150 synthetic zeolite types and 40 zeolite minerals are known. The nomenclature of zeolite minerals follows established procedures. No practical system of nomenclature for the synthetic materials and their many modifications has yet been devised. Consequently, a system based on trivial symbols is used to denote the synthetic zeolites in terms of their composition and structure.

Of great importance, in addition to the actual function of the zeolite granulates, are their mechanical properties, for example the breaking resistance and the abrasion resistance. Of particular importance is the abrasion resistance of such granulates in processes in which gases or liquids flow through the zeolite fixed beds. A high abrasion resistance is also required for zeolite granules which are used in so-called static adsorption, since otherwise their handling leads to the production of dust. Such solid zeolite granulates are used, for example, to dry the air in the space between panes of insulating glass, which makes dust formation from the granulates a particularly undesirable trait.

Molecular-sieve zeolites are crystalline aluminosilicates of group IA and group IIA elements such as sodium, potassium, magnesium, and calcium. Chemically, they are represented by the empirical formula:

$$M_{2/n}O \cdot Al_2O_3 \cdot ySiO_2 \cdot wH_2O$$

whereby y is 2 or greater, n is the cation valence, and w represents the water contained in the voids of the zeolite. Structurally, zeolites are complex, crystalline inorganic polymers based on an infinitely extending framework of $AlO_4$ and $SiO_4$ tetrahedra linked to each other by the sharing of oxygen atoms. This framework structure contains channels or interconnected voids that are occupied by the cations and water molecules. The cations are mobile and ordinarily undergo ion exchange. The water may be removed reversibly, generally by the application of heat, which leaves intact a crystalline host structure permeated by the micropores which may amount to 50% of the crystals by volume. In some zeolites, dehydration may produce some perturbation of the structure such as cation movement and some degree of framework distortion.

The structural formula of a zeolite is based on the crystal unit cell, the smallest unit of structure being represented by $$M_{x/n}[(AlO_2)_x(SiO_2)_y] \cdot wH_2O$$

where n is the valence of cation M, w is the number of water molecules per unit cell, x and y are the total number of tetrahedra per unit cell, and y/x usually has values of 1–5. Recently, however, high silica zeolites have been prepared in which y/x is 10 to 100, or even higher.

It is known to manufacture zeolite granulates, depending on the desired particle size and shape, by means of spray, fluidized bed and pan granulation, as well as extrusion, in which ceramic binders are often used. Drying and calcining steps are also added for the consolidation of the granulates or extrudates where necessary.

However, in some cases, the abrasion resistance of the zeolite granulates such as are obtained directly in the granulation process is not sufficient for the requirements of the particular application. It is desired, therefore, that a simple, cost-effective way of improving the abrasion resistance of such zeolite granulates be provided.

SUMMARY OF THE INVENTION

An object of the present invention is to improve the abrasion resistance of solid zeolite granulates. Another aspect of the present invention is to overcome problems relating to the manufacture of solid zeolite granulates that have been encountered in the past.

In achieving the above and other objects, one feature of the present invention is a process for improving the abrasion resistance of such zeolite solids, which is characterized in that the zeolite granulates are sprayed with an aqueous solution of silica sol. It was unexpectedly discovered that this single step provides an inexpensive yet effective way to improve abrasion resistance in zeolite granulates when such abrasion resistance is required, for example, to prevent the unwanted formation of dust particles from the solids.

In carrying out the process of the invention, the spraying of the zeolite can be applied at various points in the granulation process: for example, the spraying of the silica sol can be conducted by spraying finished, calcined zeolite granulates. Alternatively, the spraying can be carried out on non-calcined zeolite granulates, so-called "green compacts", which have not yet undergone a heat treatment. The spraying can also be carried out on non-calcined zeolite granulates in the fluidized bed during the drying of the formed zeolite solids.

In a particular embodiment, the zeolite granulates are placed on a rotating pan and sprayed with silica sol solution. A procedure of this kind can be either continuous or discontinuous.

BRIEF DESCRIPTION OF THE DRAWINGS

The invention will be further understood with reference to the drawing, wherein.

DETAILED DESCRIPTION OF THE INVENTION

Figure 1:
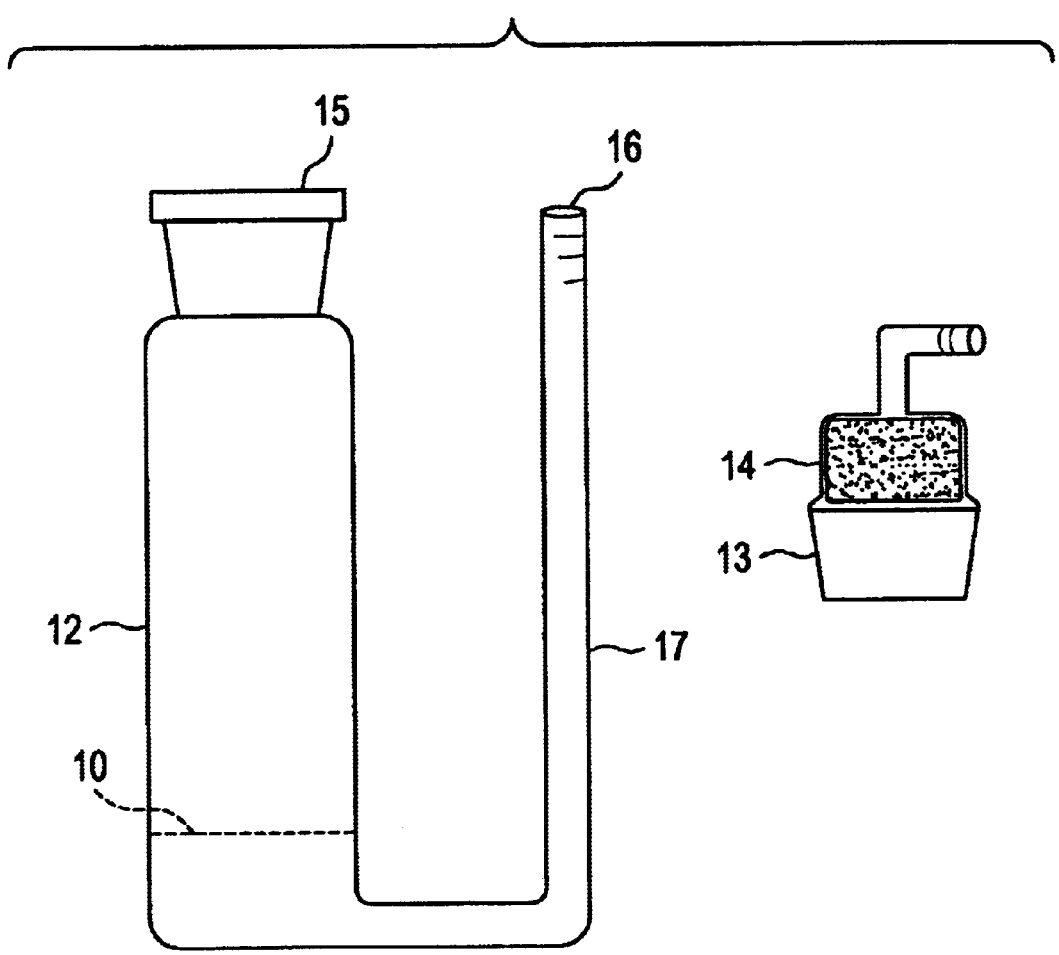
FIG. 1 is a schematic view of a test apparatus used to determine abrasion resistance.

There are many known synthetic and mineral zeolites with different types of structures, including those obtained by synthesis. Of such structures, there are three structural aspects: the basic arrangement of the individual structural units in space, which defines the framework topology; the location of charge-balancing metal cations; and the channel-filling material, which can be water, as the zeolite is formed. After the water is removed, the void space can be used for adsorption of gases, liquids, salts, elements, and many other substances. Modem tools such as x-ray crystallography have provided a very detailed description of many of these structures.

There are two types of structures. One provides an internal pore system comprised of interconnected cagelike voids; the second provides a system of uniform channels which, in some instances, are one-dimensional and in others intersect with similar channels to provide two- or three-dimensional channel systems. The preferred type has two- or three-dimensional channels to provide rapid intracrystalline diffusion in adsorption and catalytic applications.

In most zeolite structures, the primary structural units—the tetrahedra—are assembled into secondary building units which may be simple polyhedra such as cubes, hexagonal prisms, or octahedra. The final structural framework consists of assemblages of the secondary units. Models of the structures are often constructed of skeletal tetrahedra. Packing models are more realistic but are very difficult to construct.

According to a detailed aspect of the invention, the silica sol can be used in amounts such that the proportion by weight of the silicon dioxide resulting from it, referred to the dry weight of the zeolite granulates used, comes to 0.1% to 20%. In individual cases, the silica sol can be used in an amount that suffices, on the one hand, to improve the abrasion resistance of the zeolite solids, but, on the other, does not impair the function of the zeolite solids.

The silicon dioxide content of the silica sol can be from 1% to 40%. The silica sol can be stabilized with ammonium ions or with alkali metal ions. Suitable silica sols are, for example, the well known products LUDOX AS 40 and HS 40 of the DuPont company and solutions produced from the latter by dilution with water. Silica sols of this type are well known and any suitable aqueous silica sol can be used within the scope of the invention as described herein.

After the spraying of the zeolite granulates with silica sol, a drying step and a calcining step can be added, in which the drying temperature can range from 20° C. to 200° C., and the calcining temperature from 200° C. to 1000° C.

The process according to the invention has the advantage that the abrasion resistance of the zeolite granulates can be significantly improved.

Examples of important synthetic zeolites are A, X, Y, and Zeolon H, a synthetic form of mordenite. In addition, high silica synthetic zeolites are also known, such as ZSM-5 and ZSM-11. A high purity silica has been synthesized with a framework structure resembling ZSM-5. These materials have a very low alumina content and are prepared using a templating ion.

The secondary structure unit in zeolites A, X, and Y is a truncated octahedron. These polyhedral units are linked in three-dimensional space through four- or six-membered rings. The former produces the zeolite A structure, and the latter the topology of zeolites X and Y and of the mineral faujasite. In zeolite A, the internal cavity is 1.1 nm in diameter and is entered by six circular apertures 0.42 nm in size. The interlinked cavities form three-dimensional, unduloid channels with a 0.42 nm minimum diameter. The sodium ions lie in the 6-membered rings and near the 8-membered rings.

The faujasite-type structure consists of a tetrahedral arrangement of the truncated octahedra by a joining of the six-membered rings. The resulting cages are 1.3 nm in size and each is entered by a 12-membered ring, 0.8 nm in diameter. This is among the largest known pore size in zeolites.

Silicalite-1, a silica molecular sieve, topologically resembles ZSM-5 and contains the same type of building unit. After synthesis and calcination, the unit cell of 96 $SiO_2$ tetrahedra has a pore volume of $0.32 cm^3/cm^3$. There are no exchangeable metal cations, and by definition it is therefore not strictly a zeolite. The structure of Silicalite-1 consists of sheets of hexagonal $SiO_4$ rings, 3 layers wide extending in one direction. They are cross-linked by two $SiO_4$ units. The structure provides for two sets of intersecting channels which give a pore size of 0.52–0.57 nm.

The zeolite solids used have a diameter of 0.5 to 0.9 mm. They are manufactured according to DE 31 32 3779 and U.S. Pat. Nos. 4,542,115 and 4,620,399. These patents are therefore incorporated herein by reference in their entirety.

The subject matter of the invention in one embodiment uses a zeolite granulate of Type Zeolite NaA having a relatively high capacity for water. These zeolite granulates of Type NaA according to the invention have the following parameters:

| Adsorption Data: (p/po = 0.8, 20° C.) | | |
|---|---|---|
| $H_2O$ | > | 22.0% |
| $NH_3$ | > | 11.0% |
| $CO_2$ | ≦ | 0.1% |
| $O_2$ | ≦ | 0.1% |
| $N_2$ | ≦ | 0.1% |
| Ar | ≦ | 0.1% |
| $CH_3OH$ | ≦ | 0.2% |
| $CH_3CH2OH$ | ≦ | 0.2% |

The zeolite granulate of the invention can be produced by having zeolite A powder present in a mixer, adding alkali silicate (e.g., sodium silicate) solution, mixing until there are obtained zeolite granulates having a particle size of at least 0.1 mm, in a given case post-rolling the granulates, first drying the moist zeolite granulates with air at a temperature of 20° to 39° C., during which the carbon dioxide content of the drying air is regulated to less than 200 ppm, subsequently drying in a second drying step at a temperature of 40°–120° C. and in a given case drying in a third drying step at 121°–200° C. under otherwise the same conditions and subsequently activating the thus obtained granulates at a temperature of at most 600° C., for example, in a rotary tube.

As zeolite A there can be employed a powdery zeolite which has been produced according to German OS No. 24 47 021 (and related Roebke U.S. application Ser. No. 333,711 filed Dec. 23, 1981, and now abandoned, German OS No. 25 17 218 and related Roebke U.S. Pat. No. 4,073,867, German OS No. 26 51 419 and related Strack U.S. Pat. No. 4,303,628, German OS No. 26 51 420 and related Strack U.S. Pat. No. 4,303,626, German OS No. 26

51 436 and related Strack U.S. Pat. No. 4,305,916, German OS No. 26 51 437 and related Strack U.S. Pat. No. 4,303, 627, German OS No. 26 51 445, German OS No. 26 51 485 and related U.S. Pat. No. 4,303,629 and which have the particle size distribution stated there. The entire disclosures of the cited Roebke U.S. application and U.S. patent and of the cited Strack U.S. patents are hereby incorporated by reference and relied upon. Similarly the entire disclosure of German OS No. 26 51 445 is incorporated by reference and relied upon.

Preferably there is used a zeolite powder of Type A according to German OS No. 26 51 485 and the related Strack U.S. Pat. No. 4,303,629.

The water content of the zeolites can be 0–27%, preferably 15 to 22%. As alkali silicate solution there can preferably be employed a sodium silicate solution which has a module $SiO_2:Na_2O$ of 1.0 to 3.4 and a content of $Na_2O$ of 2–20 weight % and an $SiO_2$ of 5–31 weight %. The mixture of zeolite A and waterglass contains the components $Na_2O:Al_2O_3:SiO_2:H_2O$ in the ratio $1.2\pm0.2$ $Na_2O:Al_2O_3:2.4\pm0.4$ $SiO_2:12.\pm3H_2O$. As the mixer there can be employed a commercial mixer which preferably contains a nozzling in device such as plow share mixers, screw mixers mixing granulators, among others.

As post-rolling apparatus one of ordinary skill can use running aggregates such as granulating plates, coating drums, among others. Thereby there can be produced a mechanical compression and rounding off of the granulates as well as a narrowing of the particle size distribution. The drying of the zeolite granulates can be carried out in known apparatus such as drying ovens, belt driers, or fluidized bed driers continuously or discontinuously. Preferably there is employed a fluidized bed drier since thereby there can be produced simultaneously a separation of dust from the granulates. The waste air of the drying step can be recycled whereby for regulation of the carbon dioxide content to less than 200 ppm the waste drying air is mixed with the corresponding amount of fresh air. The drying can be carried out just as well in an inert gas stream, as, for example, nitrogen, i.e., the presence of carbon dioxide is not necessary.

The drying gas can have a water vapor partial pressure of 0.01 mm up to 750 mm Hg, in which case the partial pressure of the water vapor in the drying gas must be below the saturation pressure at the corresponding drying temperature. In a given case a screening with known sieve devices takes place in which case the screening can be carried out as well on wet or on dried granulates. In the case of wet screening there must be avoided a mechanical destruction of the granulates, but hereby the wrong sized particles (over and under size particles) can be mechanically disintegrated easily and returned into the granulation process. The dried zeolite granulates can be activated at a temperature of 300° to 500° C., at most 600° C. in known apparatus such as muffle furnaces, rotary tube furnaces, tube furnaces or other device continuously or discontinuously.

It is noted that the zeolite granulate of Type NaA according to the invention is particularly suited as a drying agent for insulating glass windows.

As is known, K-A zeolite granulate have all around properties for insulating glasses (Company prospectus of Bayer AG, Leverkusen "Baylith, das Molekularsieb fur den Isolierglassektor", page 4, issued 8/80, Order No. AC1358, the entire disclosure of this publication is hereby incorporated by reference and relied upon), since it selectively adsorbs only water, but not other gases such as nitrogen or argon. The generally used commercial NaA granulates, however, adsorb not only water but also nitrogen and argon, so that for the production of argon filled panes of glass there must be used K-A zeolite. However, these zeolite granulates have the disadvantage that they are produced from NaA zeolite through ion exchange with potassium salt solution and therefore are substantially more expensive than NaA zeolite granulates.

However, the NaA zeolite granulates of the invention possess the all around properties of the K-A granulates while being substantially easier to produce because according to the invention the ion exchange treatment is eliminated. The NaA zeolite granulate filled insulating windows can be prepared as set forth in the Bayer publication, for example.

EXAMPLES

To check the abrasion resistance of the finished product, the following test is performed using the apparatus illustrated schematically in FIG. 1;

Some 100 g of the substance to be tested for abrasion resistance, in this case, treated zeolite, (dry weight, determined after calcining at 450° C.) are weighed out on a precision balance (tolerance +/−0.1 g) and placed on the fritted glass bottom (10) of the test apparatus (12). A cone (13) filled tightly with glass wool (14), which serves as a filter for fine dust, is placed in position in the opening (15) at the top of the test apparatus (12). The weight of the cone filled with glass wool is determined with an analytical balance (tolerance: +/−0.002 g). An air current of 1500 l/h from an air source (16) is passed through the apparatus (12) by means of conduit (17) for a period of 3 hours. After this, the cone is carefully removed and weighed once again with the analytical balance. This produces the proportion of fine dust in percent as a measure of the abrasion resistance according to dust portion in percent=(fine dust×100)/weighed portion.

Example 1

146.8 g of dried zeolite granulates (green compacts) (dry weight after calcining at 1000° C.: 114.0 g) were placed on a laboratory granulating plate. During the rotation of the plate 1.28 g of Ludox AS 40, diluted with 1.28 g of water, were sprayed onto the zeolite granulates within 120 sec. A two-fluid nozzle (inner diameter: 0.5 mm, admission pressure 0.25 bar) was used for this. The amount of silicon dioxide contained in the silica sol, referred to the dry weight of the zeolite granulates used, came to 0.45 percent. The sprayed zeolite granulates were dried in a drying cabinet for 1 h at 50° C. and then calcined in a muffle kiln at 480° C. (heating from room temperature: 2 h; residence time: 1 h). Non-sprayed zeolite granulates were subjected to the same drying and calcining procedure for purposes of comparison. The abrasion resistance was then determined on the two samples. The zeolite granulates sprayed with silica sol led to 0.0367 percent of fine dust, while the non-sprayed zeolite granulates showed 0.0679 percent.

The zeolite granulates sprayed with silica sol according to the invention therefore exhibited an improved abrasion resistance.

Example 2

200.0 g of calcined zeolite solids (dry weight after calcining at 1000° C.: 197.0 g) were placed on a laboratory granulating plate. During the rotation of the plate 2.5 g of Ludox AS 40, diluted with 7.5 g of water, were sprayed onto the zeolite granulates within 120 sec. A two-fluid nozzle (inner diameter: 0.5 mm, admission pressure 0.25 bar) was used for this. The amount of silicon dioxide contained in the silica sol, referred to the dry weight of the zeolite granulates used, came to 0.51 percent. The sprayed zeolite granulates were dried in parallel with non-sprayed zeolite granulates in a drying cabinet for 1 h at 50° C. and then calcined in a muffle kiln at 480° C. (heating from room temperature: 2 h, resident time: 1 h). The abrasion resistance was then determined on the two samples. The zeolite granulates sprayed with silica sol led to 0.0069 percent of fine dust, while the non-sprayed zeolite granulates showed 0.0330 percent.

The zeolite granulates sprayed with silica sol according to the invention therefore exhibited an improved abrasion resistance.

Example 3

The test according to Example 2 was repeated with 400.0 g of calcined zeolite solids from another batch, during which 2.5 g of Ludox AS 40, diluted with 17.5 g of water, were sprayed on within 150 sec. The amount of silicon dioxide contained in the silica sol, referred to the dry weight of the zeolite granulates used, thus came to 0.25 percent. The zeolite solids sprayed with silica sol led to 0.0164 percent of fine dust, the non-sprayed zeolite granulates to 0.0428 percent.

Example 4

The test according to Example 3 was repeated, in which 8.0 g of Ludox AS 40, diluted with 12.0 g of water, were sprayed on within 240 sec. The amount of silicon dioxide contained in the silica sol, referred to the dry weight of the zeolite granulates used, thus came to 0.81 percent. The zeolite granulates sprayed with silica sol led to 0.0137 percent of fine dust, the zeolite solids not sprayed with silica sol to 0.0428 percent.

The Following are Examples of Making the Solid Zeolite Granulates to be Sprayed with Silica Sol Example 5

There were present in a screw mixer 100 kg of zeolite A (made according to German OS No. 26 51 485 and related Strack U.S. Pat. No. 4,303,629, having a water content of 21%). To this there were added 49 kg of waterglass (Module 3.38, $Na_2O$=4.8 weight %, $SiO_2$=15.7 weight %). There were obtained granulates having a particle size of 0.1 to 3 mm, which were subsequently post-rolled on a granulating plate. There was thus obtained a narrow particle spectrum (0.3–2.5 mm). The granulates were screened in the wet condition into particle fractions <1 mm, 1–2 mm and >2 mm.

The particle fraction of 1–2 mm was dried in a fluidized bed drier in a first step at 35° C. and in a second step at 110° C. Hereby a part of the waste air was recycled so that the $CO_2$ content of the air was 150 ppm. The partial pressure of the water vapor in the first step was 21 mm Hg and in the second step 117 mm Hg. The granulates were activated in a rotary tubular furnace at 420° C.

The product had the following properties:

| | |
|---|---|
| Particle Size | 1–2 mm |
| Appearance | round, white, dust free |
| Resistance to Fracture | at least 2 kg (1 mm beads) |
| Adsorption Data | (p/po = 0.8 20° C.) |
| $H_2O$ | 23.4% |
| $NH_2$ | 12.0% |
| $CO_2, O_2, N_2, Ar$ | < 0.1% |
| Methanol, Ethanol | < 0.2% |

Example 6

12 kg of zeolite A (made according to German OS No. 26 51 485 and related Strack U.S. Pat. No. 4,303,629, having a water content of 10.1%) were mixed with 8.4 kg of sodium silicate solution (8.4% $Na_2O$, 8.0% $SiO_2$, module 1.0) as described in Example 5, granulated and dried in the drying oven first at 30° C., then at 110° C. After the activation in a muffle furnace at 400° C. the sample showed the following adsorption data.

| (p/po = 0.8 20° C.) | |
|---|---|
| $H_2O$ | 28.9% |
| $NH_2$ | 14.2% |
| $CO_2, O_2, N_2, Ar$ | 0.1% |
| Ethanol | 0.1% |
| Methanol | 0.15% |

Example 7

The wet granulates obtained according to Example 5 were dried in a horizontal, heatable glass tube in a stream of pure nitrogen (water vapor partial pressure 0.1 mm Hg) first at 22° C., then at 110° C. and activated in the same apparatus while further leading nitrogen through at 400° C.

| Adsorption Data: (p/po = 0.8 20° C.) | |
|---|---|
| $H_2O$ | 23.0% |
| $NH_3$ | 12.2% |
| $N_2, O_2, CO_2, Ar$ | 0.1% |
| Methanol, Ethanol | 0.12% |

Further variations and modifications of the foregoing will be apparent to those skilled in the art and are intended to be encompassed by the claims appended hereto.

German priority application no. 196 43 957.4 is relied on and incorporated herein by reference.

We claim:

1. A process for producing solid zeolite granulates having abrasion resistance, comprising:

mixing zeolite A powder in a mixer with aqueous alkali silicate solution to obtain moist zeolite granulates having a particle size of at least 0.1 mm, drying in a first drying step the moist zeolite granulates with drying air, at a temperature from 20° to 39° C., wherein the carbon dioxide content of the drying air is regulated to less than 200 ppm, drying in a second drying step at a temperature from 40° to 120° C., activating the granulates at a temperature of not more than 600° C., and spraying the granulates with an aqueous silica sol.

2. The process according to claim 1, wherein the proportion by weight of the silicon dioxide resulting from the silica sol, referred to the dry weight of the zeolite granulates, is from 0.1 to 20%.

3. The process according to claim 1, wherein the silica sol contains up to 40 percent of silicon dioxide.

4. The process according to claim 1, wherein the silica sol is stabilized with alkali metal ions or ammonium ions.

5. The process according to claim 1, wherein after spraying with silica sol the zeolite body is dried at a temperature from 20° C. to 200° C. and calcined at a temperature from 200° C. to 1000° C.

6. A process for producing solid zeolite granulates having abrasion resistance, comprising mixing zeolite A powder in a mixer with aqueous alkali silicate solution to obtain zeolite granulates having a particle size of at least 0.1 mm, drying in a first drying step the moist zeolite granulates with drying air, at a temperature from 20° to 39° C., wherein the carbon dioxide content of the drying air is regulated to less than 200 ppm, drying in a second drying step at a temperature from 40° to 120° C., spraying the granulates with an aqueous silica sol, and activating the granulates at a temperature of not more than 600° C.

7. The process according to claim 6, wherein the proportion by weight of the silicon dioxide resulting from the silica sol, referred to the dry weight of the zeolite granulates, is from 0.1 to 20%.

8. The process according to claim 6, wherein the silica sol contains up to 40 percent of silicon dioxide.

9. The process according to claim 6, wherein the silica sol is stabilized with alkali metal ions or ammonium ions.

10. A process for producing solid zeolite granulates having abrasion resistance, comprising:

mixing zeolite A powder in a mixer with aqueous alkali silicate solution to obtain zeolite granulates having a particle size of at least 0.1 mm, drying in a first drying step the moist zeolite granulates with drying air, at a temperature from 20° to 39° C., wherein the carbon dioxide content of the drying air is regulated to less than 200 ppm, spraying the granulates with an aqueous silica sol while drying in a second drying step at a temperature from 40° to 120° C., and activating the granulates at a temperature of not more than 600° C.

11. The process according to claim 10, wherein the proportion by weight of the silicon dioxide resulting from the silica sol, referred to the dry weight of the zeolite granulates, is from 0.1 to 20%.

12. The process according to claim 10, wherein the silica sol contains up to 40 percent of silicon dioxide.

13. The process according to claim 10, wherein the silica sol is stabilized with alkali metal ions or ammonium ions.

14. A process for producing solid zeolite granulates having abrasion resistance, comprising:

mixing zeolite A powder in a mixer with aqueous alkali silicate solution to obtain moist zeolite granulates having a particle size of at least 0.1 mm, drying in a first drying step the moist zeolite granulates with drying air, at a temperature from 20° to 39° C., wherein the carbon dioxide content of the drying air is regulated to less than 200 ppm, drying in a second drying step at a temperature from 40° to 120° C., activating the granulates at a temperature of not more than 600° C., and spraying the granulates with an aqueous solution consisting essentially of silica sol.

15. A process for producing solid zeolite granulates having abrasion resistance, comprising:

mixing zeolite A powder in a mixer with aqueous alkali silicate solution to obtain zeolite granulates having a particle size of at least 0.1 mm, drying in a first drying step the moist zeolite granulates with drying air, at a temperature from 20° to 39° C., wherein the carbon dioxide content of the drying air is regulated to less than 200 ppm, drying in a second drying step at a temperature from 40° to 120° C., spraying the granulates with an aqueous solution consisting essentially of silica sol, and activating the granulates at a temperature of not more than 600° C.

16. A process for producing solid zeolite granulates having abrasion resistance, comprising:

mixing zeolite A powder in a mixer with aqueous alkali silicate solution to obtain zeolite granulates having a particle size of at least 0.1 mm, drying in a first drying step the moist zeolite granulates with drying air, at a temperature from 20° to 39° C., wherein the carbon dioxide content of the drying air is regulated to less than 200 ppm, spraying the granulates with an aqueous solution consisting essentially of silica sol while drying in a second drying step at a temperature from 40° to 120° C., and activating the granulates at a temperature of not more than 600° C.

17. A process for producing solid zeolite granulates having abrasion resistance, comprising:

mixing zeolite A powder in a mixer with aqueous alkali silicate solution to obtain moist zeolite granulates having a particle size of at least 0.1 mm, drying in a first step the moist zeolite granulates with drying air, at a temperature from 20° to 39° C., wherein the carbon dioxide content of the drying air is regulated to less than 200 ppm, drying in a second step at a temperature from 400 to 120° C., activating the granulates at a temperature of not more than 600° C., and spraying the granulates with an aqueous solution consisting of silica sol.

18. A process for producing solid zeolite granulates having abrasion resistance, comprising:

mixing zeolite A powder in a mixer with aqueous alkali silicate solution to obtain zeolite granulates having a particle size of at least 0.1 mm, drying in a first drying step the moist zeolite granulates with drying air, at a temperature from 20° to 39° C., wherein the carbon dioxide content of the drying air is regulated to less than 200 ppm, drying in a second drying step at a temperature from 40° to 120° C., spraying the granulates with an aqueous solution consisting of silica sol, and activating the granulates at a temperature of not more than 600° C.

19. A process for producing solid zeolite granulates having abrasion resistance, comprising:

mixing zeolite A powder in a mixer with aqueous alkali silicate solution to obtain zeolite granulates having a particle size of at least 0.1 mm, drying in a first drying step the moist zeolite granulates with drying air, at a temperature from 20° to 39° C., wherein the carbon dioxide content of the drying air is regulated to less than 200 ppm, spraying the granulates with an aqueous solution consisting of silica sol while drying in a second drying step at a temperature of from 40° to 120° C., and activating the granulates at a temperature of not more than 600° C.

* * * * *